(12) United States Patent
Smid et al.

(10) Patent No.: US 9,063,995 B2
(45) Date of Patent: Jun. 23, 2015

(54) ACCESS CONTROL LIST (ACL) GENERATION FOR REPLICATED DATA

(71) Applicant: SAP AG, Walldorf (DE)

(72) Inventors: Maschhur Smid, Walldorf (DE); Joachim Burgert, Speyer (DE)

(73) Assignee: SAP SE, Walldorf, DE (US)

( * ) Notice: Subject to any disclaimer, the term of this patent is extended or adjusted under 35 U.S.C. 154(b) by 65 days.

(21) Appl. No.: 13/739,201

(22) Filed: Jan. 11, 2013

(65) Prior Publication Data

US 2014/0201135 A1    Jul. 17, 2014

(51) Int. Cl.
G06F 7/00 (2006.01)
G06F 17/00 (2006.01)
G06F 17/30 (2006.01)

(52) U.S. Cl.
CPC .............................. *G06F 17/30575* (2013.01)

(58) Field of Classification Search
CPC .............. G06F 17/30; G06F 17/30575; G06F 17/30578; G06F 17/30581
See application file for complete search history.

(56) References Cited

U.S. PATENT DOCUMENTS

| | | | |
|---|---|---|---|
| 8,653,914 B2 * | 2/2014 | Jones | 335/185 |
| 8,782,004 B2 * | 7/2014 | Ducott et al. | 707/638 |
| 2004/0044763 A1 * | 3/2004 | Besson | 709/224 |
| 2009/0144804 A1 | 6/2009 | Idicula et al. | |
| 2010/0082552 A1 | 4/2010 | Beatty et al. | |
| 2011/0035359 A1 | 2/2011 | Bendakovsky et al. | |
| 2013/0185280 A1 | 7/2013 | Ma et al. | |
| 2014/0114972 A1 * | 4/2014 | Ducott et al. | 707/737 |
| 2014/0201136 A1 | 7/2014 | Smid et al. | |

* cited by examiner

*Primary Examiner* — Azam Cheema
(74) *Attorney, Agent, or Firm* — Fountainhead Law Group PC

(57) ABSTRACT

In one embodiment, a method replicates data from a first database system to a second database system. A trigger table associated with the first database system is determined. The trigger table includes information for rows in tables of the first database system relevant to authorizations in the first database system. The method generates an access control list (ACL) report from the trigger table. The ACL report includes information for setting ACL rules for the second database system. An access context is determined for an entity from the ACL report. The method then generates an ACL rule based on the access context to restrict access to the replicated data in the second database system to users associated with the access context.

16 Claims, 10 Drawing Sheets

| DB_TABLE | ACTION | DB_KEYSTRING | ACL_FIELD | ACL_VALUE | DB_SCHEME |
|---|---|---|---|---|---|
| VBAK | I | 1228446264 | F1 | 4711 | CUAN_ERP |
| VBAK | I | 1228446264 | F2 | DE | CUAN_ERP |
| VBAK | D | 4564554605 | F1 | 1234 | CUAN_ERP |
| VBAK | D | 4389548858 | F2 | BG | CUAN_ERP |
| TBAT | I | 187733 | DTF | 20 Dec 2011 | CRM_S |

FIG. 3

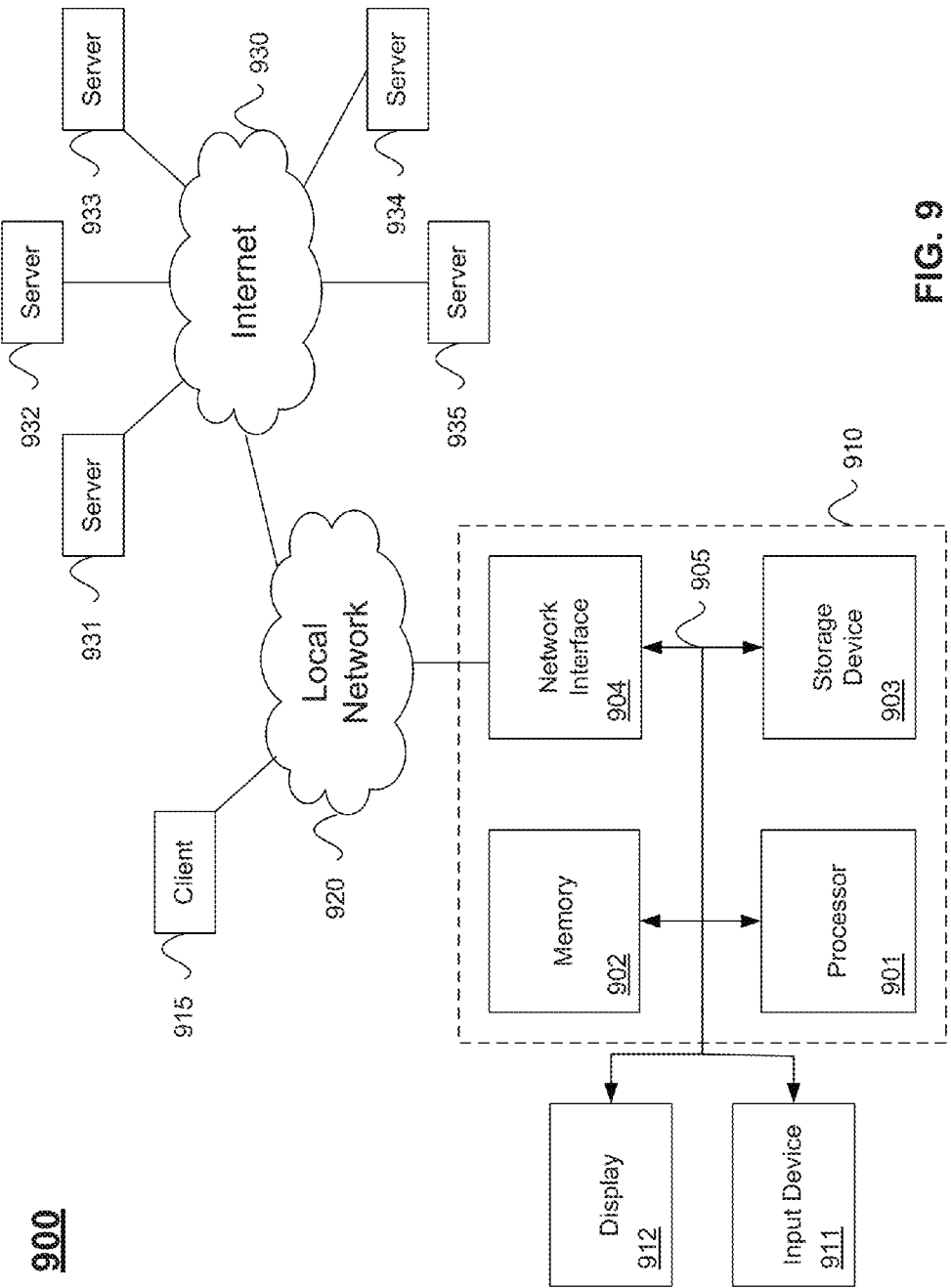

ACCESS CONTROL LIST (ACL) GENERATION FOR REPLICATED DATA

BACKGROUND

In a back-end database system, such as an enterprise resource planning (ERP) or customer relationship management (CRM) back-end database, authorizations are modeled for the ERP or CRM data. The authorizations restrict access to the data in the back-end system. However, accessing the back-end system may be slow due to the large amount of data that is stored.

Companies may opt to use more specialized database systems that allow more efficient and quicker access to data. In this case, the data from the back-end system is replicated to a new database that allows more efficient access. However, when data is replicated to the new database systems, the authorizations in the back-end database are not transferred.

SUMMARY

In one embodiment, a method replicates data from a first database system to a second database system. A trigger table associated with the first database system is determined. The trigger table includes information for rows in tables of the first database system relevant to authorizations in the first database system. The method generates an access control list (ACL) report from the trigger table. The ACL report includes information for setting ACL rules for the second database system. An access context is determined for an entity from the ACL report. The method then generates an ACL rule based on the access context to restrict access to the replicated data in the second database system to users associated with the access context.

In one embodiment, a non-transitory computer-readable storage medium is provided containing instructions, that when executed, control a computer system to be configured for: replicating data from a first database system to a second database system; determining a trigger table associated with the first database system, the trigger table including information for rows in tables of the first database system relevant to authorizations in the first database system; generating an access control list (ACL) report from the trigger table, the ACL report including information for setting ACL rules for the second database system; determining an access context for an entity from the ACL report; and generating an ACL rule based on the access context to restrict access to the replicated data in the second database system to users associated with the access context.

In one embodiment, a system is provided comprising: a first database system including: back-end database tables; and authorizations for the back-end database tables; and a second database system configured for: replicating data from a first database system to a second database system; receiving a trigger table from the first database system, the trigger table including information for rows in tables of the first database system relevant to authorizations in the first database system; generating an access control list (ACL) report from the trigger table, the ACL report including information for setting ACL rules for the second database system; determining an access context for an entity from the ACL report; and generating an ACL rule based on the access context to restrict access to the replicated data in the second database system to users associated with the access context.

The following detailed description and accompanying drawings provide a better understanding of the nature and advantages of particular embodiments.

BRIEF DESCRIPTION OF THE DRAWINGS

FIG. 3 depicts an example of a trigger table according to one embodiment.

FIG. 9 illustrates hardware of a special purpose computing machine configured with an access control system according to one embodiment.

DETAILED DESCRIPTION

Described herein are techniques for using generating access control list (ACL) rules for replicated data. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

ACL Rule Generation for Replicated Data

Figure 1:
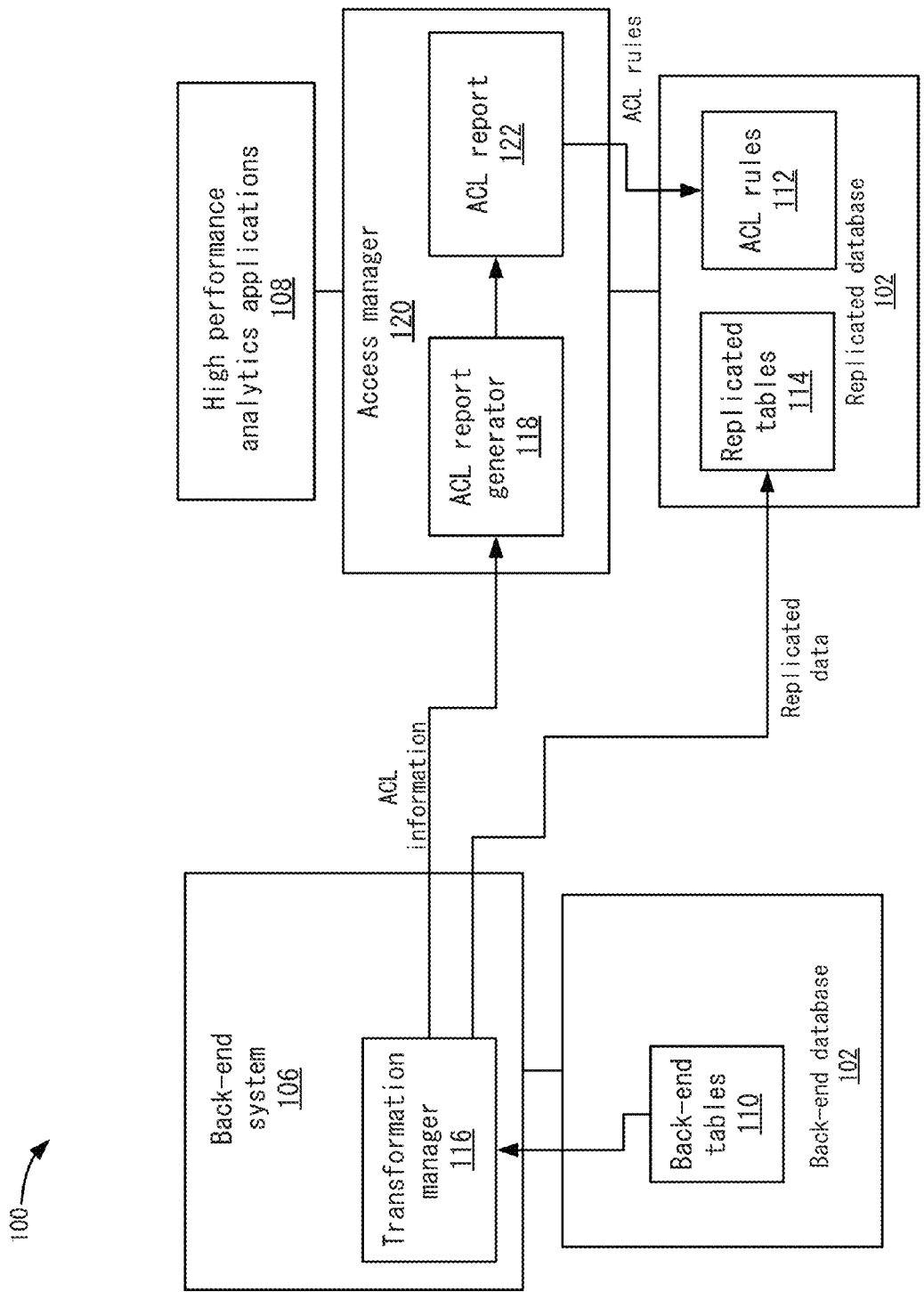
FIG. 1 depicts a simplified system for generating ACL rules for replicated data according to one embodiment.

FIG. 1 depicts a simplified system 100 for generating ACL rules for replicated data according to one embodiment. System 100 includes a back-end database 102 and a replicated database 104. A back-end system 106 interfaces with back-end database 102. Further, high-performance analytics (HPA) applications 108 may access replicated database 104.

Back-end database 102 may include multiple back-end tables 110. Back-end tables 110 may store data for ERP, CRM, or other systems. High-performance analytics applications 108 operate on data in replicated database 104 instead of data in back-end database 102. This allows high-performance analytics applications 108 to access data more efficiently and faster from replicated database 104.

The data in back-end database 102 is governed by authorization concepts, including authorization objects, rules, keys, etc. However, access control for high-performance analytics applications 108 should be according to various entities, such as groups of users that are part of a legal entity. Particular embodiments provide access control list (ACL) rules 112 in replicated database 104 that are equivalent to the authorizations found in back-end database 102, but are based on entities. Due to the different natures of back-end database 102 and replicated database 104, particular embodiments may transform one authorization concept in back-end database 102 to another authorization concept (ACL rules 112) in replicated database 104. The transformation may generate ACL rules based on entities that will access the replicated data in replicated tables 114 in replicated database 104.

A transformation manager 116 receives data from tables 110 in back-end database 102. To replicate the data to replication tables 114, transformation manager 116 may need to transform the data. The data is transformed according to the requirements of replicated database 104. For example, the transformation will be done on a Business Add In (BADI) that contains an application semantic.

Transformation manager 116 triggers the process for ACL rule generation in replicated database 104. Also, transformation manager 116 supplies ACL information that is needed by replicated database 104 to generate ACL rules 112.

Particular embodiments provide access control list (ACL) rules 112 in replicated database 104 that are equivalent to the authorization concepts for the data that was transformed. An ACL report generator 118 receives ACL information that can be used for generating ACL rules 112. For example, as will be described in more detail below, a trigger table may be used to generate an ACL report 122 that summarizes the authorization concepts for the replicated data.

An access manager 120 receives ACL report 122 from ACL report generator 118. Access manager 120 uses ACL report 122 to generate ACL rules 112 for entities used by high-performance analytics applications 108. ACL rules 112 are assigned to objects in replicated table 114, such as business objects, and authorize access to the objects based on an access context, which may be various user roles that can be assigned to a user.

Figure 2:
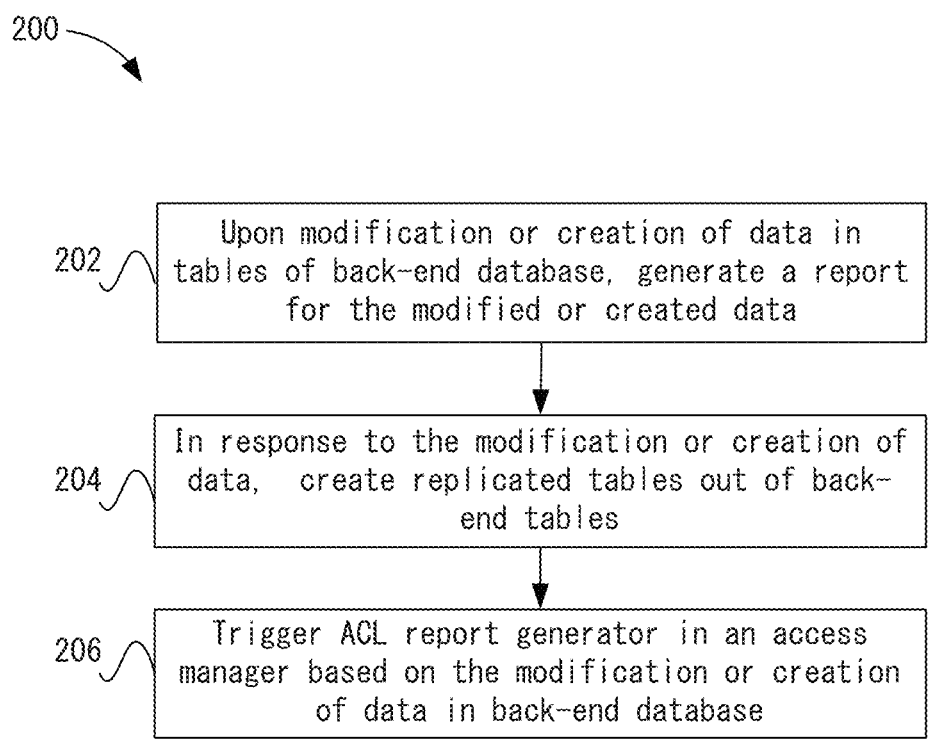
FIG. 2 depicts a simplified flowchart of a method for generating ACL rules according to one embodiment.

FIG. 2 depicts a simplified flowchart 200 of a method for generating ACL rules 112 according to one embodiment. At 202, upon modification or creation of data in tables 110 of back-end database 102, back-end database 102 generates a report for the modified or created data. At 204, in response to the modification or creation of data, transformation manager 116 creates replicated tables 114 out of back-end tables 110. This is either an initial replication if the data was created or a replication upon modification of back-end data.

At 206, transformation manager 116 triggers ACL report generator 118 in access manager 120 based on the modification or creation of data in back-end database 102. The trigger includes ACL information that can be used to generate ACL report 122. As will be described in more detail below, transformation manager 116 sends a trigger table to ACL report generator 118. In one embodiment, the trigger table includes keys and the key-related authorization-relevant values from back-end tables 110 indicating the relevant changes and creations that caused the replication. In one embodiment, transformation manager 116 uses a remote function call (RFC) to notify ACL report generator 118 of the change and also hand over the trigger table as an input parameter.

Once ACL report generator 118 receives the ACL information, ACL report generator 118 can generate ACL report 122. ACL report generator 118 generates ACL report 122 based on the data of the trigger table and also metadata of high-performance analytics applications 108. The metadata may be found in replicated database 104, such as in controller tables and application-specific service provider classes. In one example, the trigger table may include the following scheme:

| Field Name | Type |
|---|---|
| DB_TABLE | CHAR 30 |
| ACTION | CHAR 1 ('D', 'I' or 'U') |

-continued

| Field Name | Type |
|---|---|
| DB_KEYSTRING | CHAR 512 |
| ACL_FIELD | CHAR 30 |
| ACL_VALUE | CHAR 512 |
| DB_SCHEME | CHAR 30 |

The trigger table contains information about the rows of back-end tables 110 in back-end database 102 that have undergone a change, have been created, or have been deleted, and are relevant for ACL rule generation. The field DB_SCHEME and the field DB_TABLE indicate the scheme and table in which changes occurred that caused the trigger of the data replication. The field ACTION indicates the kind of change the corresponding row in the table that is named in the field DB_TABLE has undergone.

FIG. 3 depicts an example of a trigger table 300 according to one embodiment. At a column 302, the database tables are identified. At a column 304, an action is provided. The action when equal to "I" (for INSERT) means that this action is always authorization-relevant because a new row was created where new ACL rules may need to be created. When the action is equal to "U" (for UPDATE), this action is authorization-relevant only if one of the values in the field ACL_FIELD had been changed. This is because if a before-and-after image is not known, then every change has to be taken into account. In this case, ACL rules may need to be updated. If the action is equal to "D" (for DELETE), this action is always authorization-relevant because ACL rules may need to be deleted.

At a column 306, a key string is provided that describes the key to the table. At a column 308, an ACL field is identified. This identifies an authorization in the back-end database 102 for the table. At a column 310, a value for the ACL field is given. At a column 312, the database scheme of the table is provided, such as ERP or CRM.

To generate ACL report 122, ACL report generator 118 retrieves application-dependent information for each entry in trigger table 300. Transformation manager 116 hands over this information for every replicated record of back end tables 110 to replicated database 102. The information that is relevant is determined by the implemented BADI on transformation manager 116.

For example, the application-dependent information includes a node identifier for the root node for each table. This may be retrieved from the field DB_KEYSTRING in column 306 of trigger table 300. Additionally, ACL report generator 118 retrieves an access context code from the ACL_FIELD in column 308. This gives the access context of the ACL. Also, ACL report generator 118 retrieves the ACL value from the field ACL_VALUE in column 310.

For each instance of trigger table 300, ACL report generator 118 needs to retrieve the ACL-UUID from the previously-retrieved ACL_VALUE. For every combination of ACL values, the UUID (Universally Unique Identifier) is generated.

ACL report generator 118 now includes all the relevant information needed to generate ACL report 122. For example, the access context code, ACL table names, ACL-UUID, and node ID of the changed instance in replicated table 114 is now known. This information can be used to generate an ACL rule 112 for the replicated instance in replication table 114. To generate ACL rule 112, at first the legal entity is defined (with Application owner). Based on this entity (i.e. sales Org or company code), access manager 120 determines for every replicated record, an ACL rule based on control information in the trigger table. The generated ACL rules 112 are stored replicated database 102 and linked to the related replicated record.

Process-Oriented Modeling

Figure 4A:
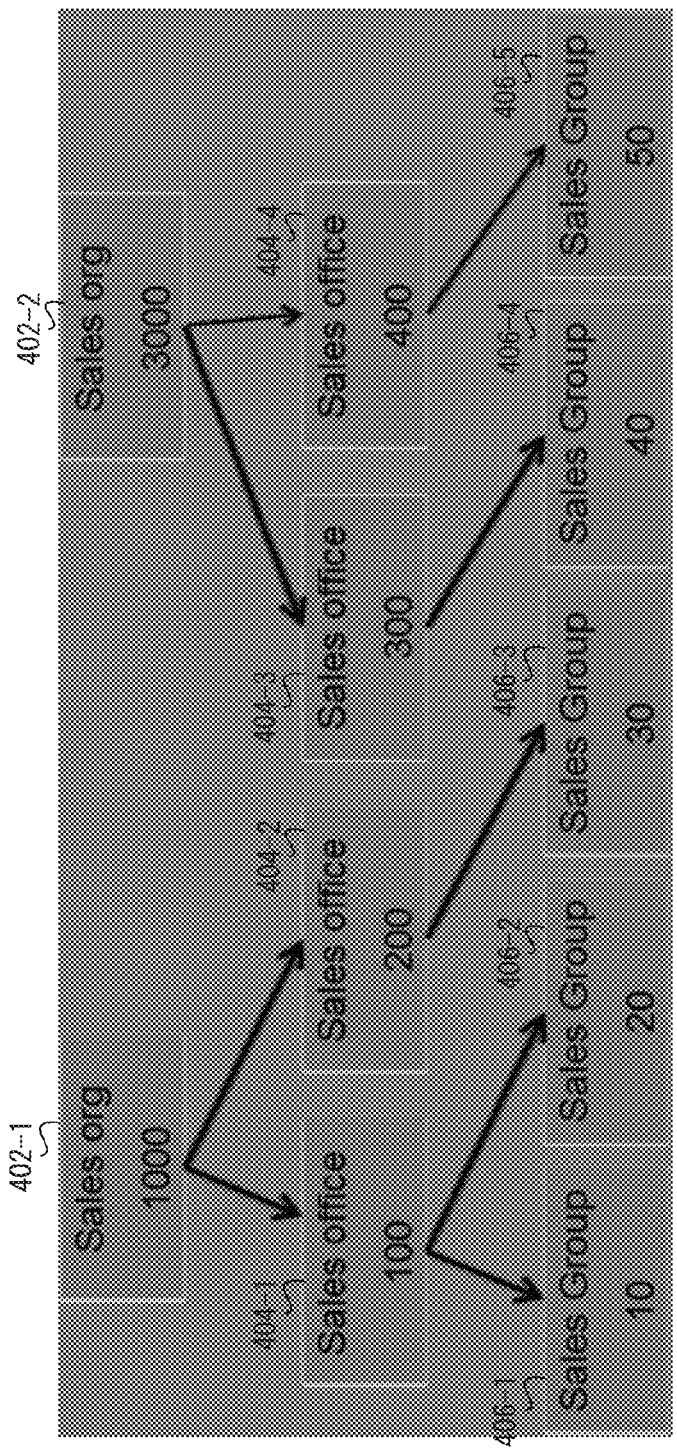
FIG. 4A depicts an example of a hierarchy of a legal entity according to one embodiment.

As mentioned above, ACL rules 112 are associated with an access context. The access context is used to determine if user's with a certain role in an entity can access data. Thus, the access context describes the role's that can access the data. For example, the access context may be an organization and can be further described by sub-groups, such as an access group. For example, the access context may be based on a hierarchy of a legal entity, such as a company. FIG. 4A depicts an example of a hierarchy of a legal entity according to one embodiment. A first root node 402-1 of sales org and a second root node 402-2 of sales org (3000) are shown. These may be separate organizations in the same company. A second level of the hierarchy shows various sales office nodes 404-1-404-4. A third level of the hierarchy shows various sales group nodes 406-1-406-5. Each node in the hierarchy may depend on another node. Thus, if a node in the hierarchy belongs to two parent nodes, then the node would have access to data for the two parent nodes. Each node may be assigned a relevant access context. A child node to one of the parent nodes would inherit the access context of the parent node.

Figure 5:
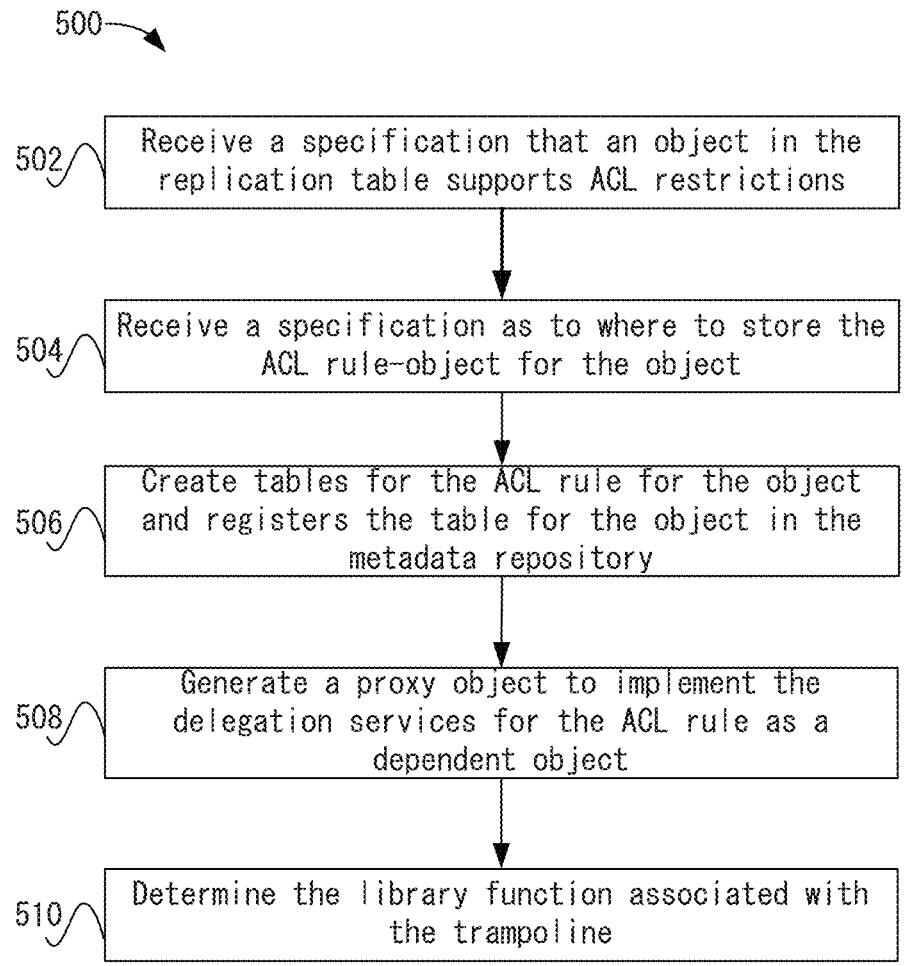
FIG. 5 depicts a simplified flowchart for generating ACL rules for objects in a replication table according to one embodiment.

To generate ACL rules 112 with the appropriate access context, particular embodiments provide a process to assign an entity to objects in replication table 114. FIG. 5 depicts a simplified flowchart for generating ACL rules for objects in replication table 114 according to one embodiment. At 502, access manager 120 receives a specification that an object in replication table 114 supports ACL restrictions. In this case, access manager 120 assigns an access context to the object. Access manager 120 may include an ACL rule in the object type in addition to a list of access contexts supported by the object. In one example, a user may assign an ACL rule to the object as a dependent object to the object's root node. The object is then activated.

Figure 4B:
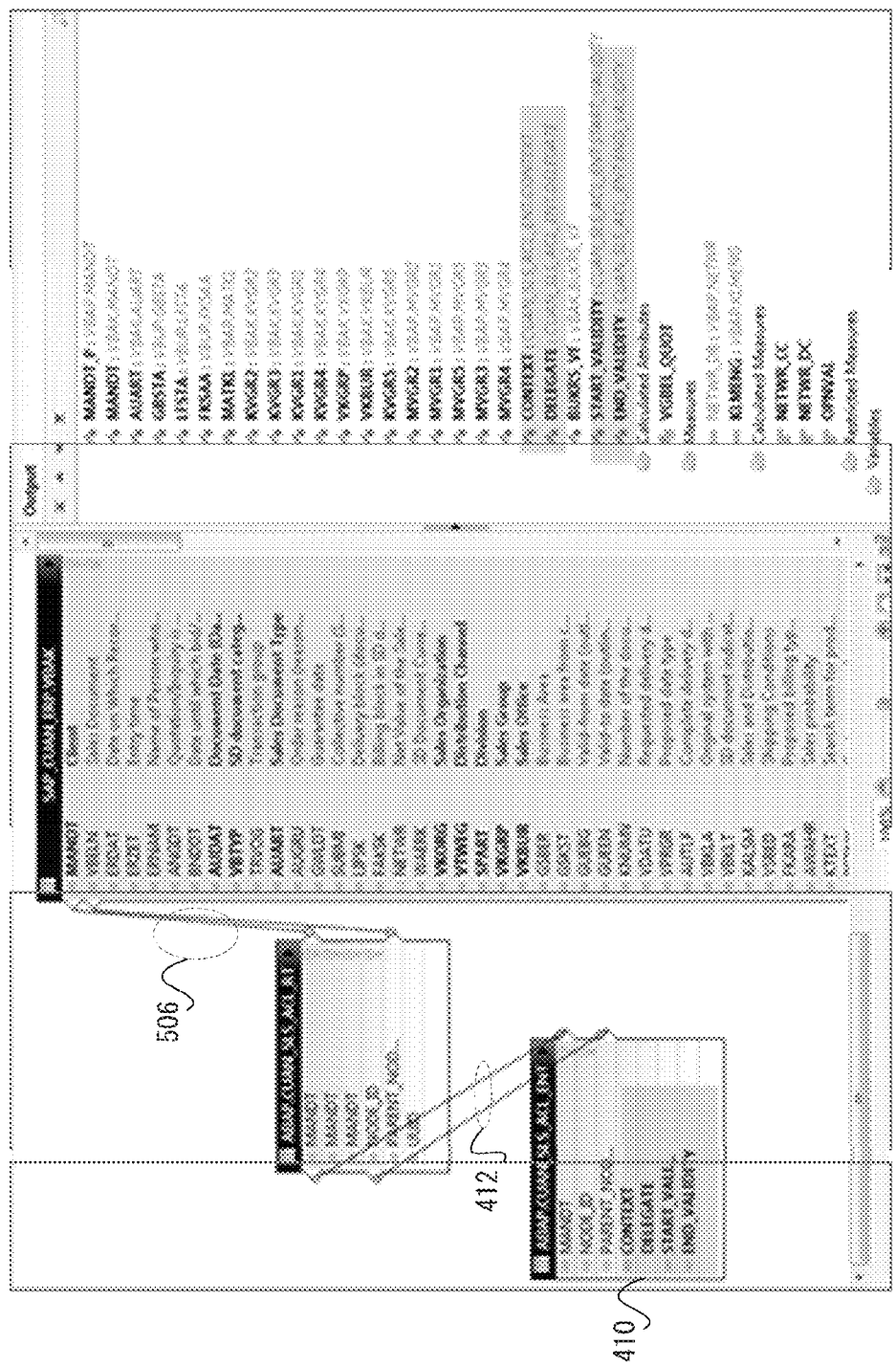
FIG. 4B depicts a relation between ACL tables and a business model according to one embodiment.

One example of the specification is when models and ACL tables are joined before ACL generation. FIG. 4B depicts a relation between ACL tables and a business model according to one embodiment. At 410, ACL fields CONTEXT, DELEGATE, START_VALIDITY, END_VALIDITY of ACL entry table CUAN_RBAM_SLS_ACLENTRY are declared in the output structure of the model—in all relevant analytic and calc views. At 412, a relation between a BO-Table and an ALC_RT table is 1:1 and the relation between the ACL_RT table and an ACL_ENT table is 1:N—depending on the access contexts. In one embodiment, only one access context may be supported and thus, the relation between ACL_RT and ACL_ENT is therefore implicitly set to 1:1.

At 504, access manager 120 receives a specification as to where to store the ACL rule-object for the object. For example, a user may specify where to store the ACL rule. A standard storage location may be a set of tables that is assigned to the object in a metadata repository in replicated database 114.

At 506, access manager 120 creates tables for the ACL rule for the object and registers the table for the object in the metadata repository. This assigns the persistency to use the ACL to the object.

At 508, access manager 120 generates a proxy object to implement the delegation services for the ACL rule as a dependent object. In this case, the ACL rule is a dependent object on the object and the ACL rule will be checked when access is requested for the object.

Once the ACL rule is associated with the object, users must be associated with a proper role to access the object. For example, the user must have the same access context as the object, such as a proper access group.

Process-Oriented Flow to Restrict Access to Objects

When replicating data from back-end database 102 to replication table 114, ACL rules 112 are associated with an object, such as a business object, in replication table 114. ACL rules 112 restrict access to objects in replication table 114 based on an access context.

Figure 6:
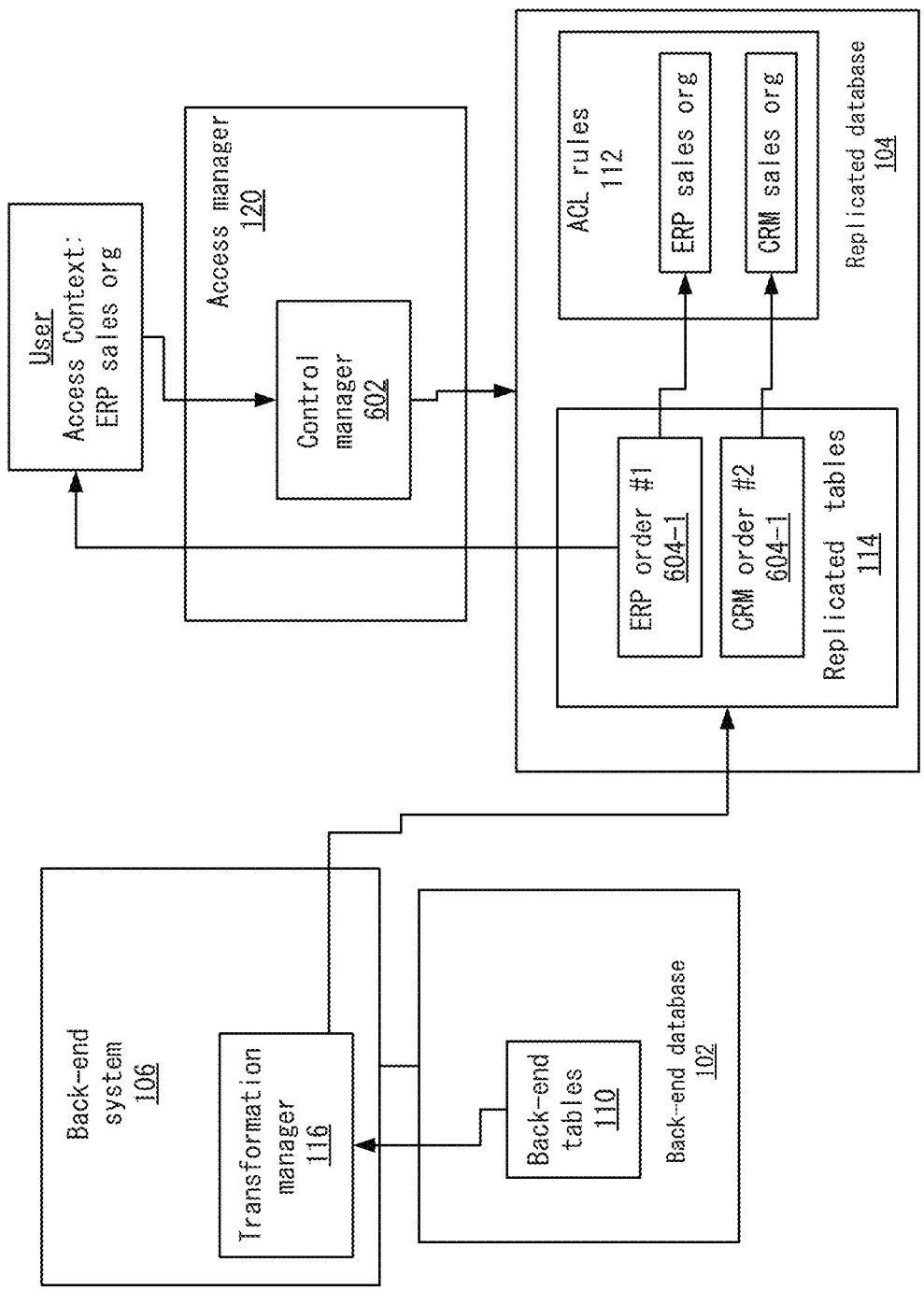
FIG. 6 depicts an example of restricting access to objects in the replication table according to one embodiment.

FIG. 6 depicts an example of restricting access to objects in replication table 114 according to one embodiment. A user may be assigned an access context. For example, the access context may be associated with a root node of hierarchy 500. Additionally, the access context may include an access group, which may be a child node to the access context, such as sales office. An example of an access context may be ERP sales org and an example of an access group may be sales office: Munich.

The user may send a request to retrieve ERP orders from replication tables 114. A database control manager 602 determines if the user should be granted access to the requested objects. For example, control manager 602 determines the access context for the user. Then, control manager 602 determines whether the user is restricted from viewing the objects. For example, control manager 602 reviews ACL rules 112 that are associated with the objects and the access context associated with the user to determine whether the user should be granted access to the objects. In one example, a first object 604-1 is an "ERP order #1" and has an access context of "ERP sales org". A second object 604-2 is an object "CRM order #2" and includes an access context of "CRM sales org". The user includes the access context of "ERP sales org". In this case, ERP order #1 includes the same access context that the user has been assigned and thus the user can access ERP order #1. However, CRM order #2 does not include the same access context as the user and thus the user is restricted from accessing this order. In response, control manager 602 provides the user access to ERP order #1. After data selection the data are filtered with the help of an application API (Check Authority) that has authority logic based on user authority profiles. For example if the user profile only allowed the user to display data of sales Org 100, after selection of the data, the application API will discard all data records that includes value different to org 100.

Figure 7:
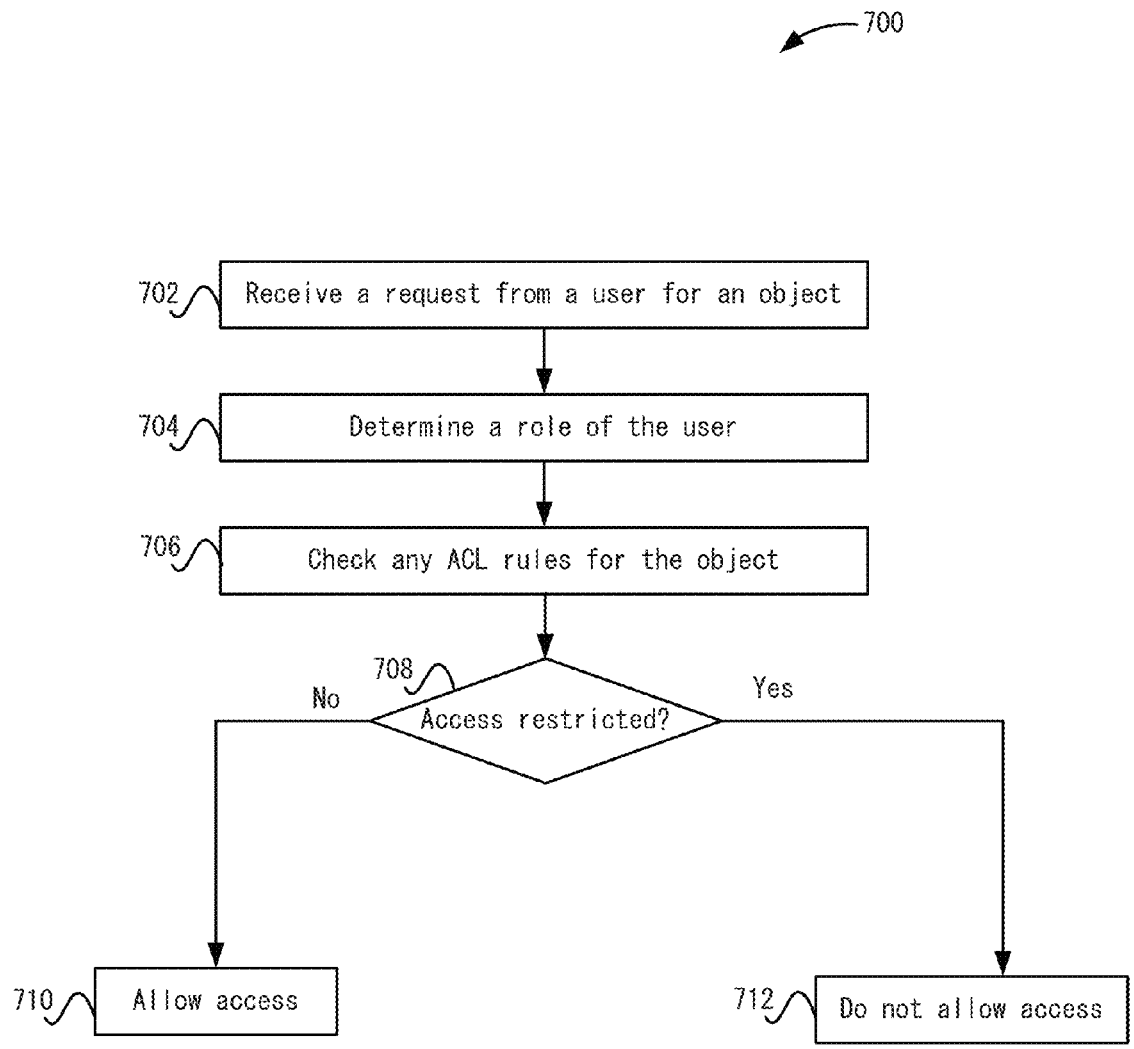
FIG. 7 depicts a simplified flowchart of a method for determining whether to allow access to an object according to one embodiment.

FIG. 7 depicts a simplified flowchart 700 of a method for determining whether to allow access to an object according to one embodiment. At 702, control manager 602 receives a request from a user for an object. At 704, control manager 602 determines a role of the user. For example, an access context and access group may be determined for the user.

At 706, control manager 602 checks any ACL rules for the object. For example, the ACL rule may be dependent on the object in replicated database 104, such as the ACL rule may be found in a metadata table. At 708, control manager 602 determines if access is restricted. For example, if the access context and the access group of the object match the access context and access group of the user, at 710, control manager 602 allows access. If the access context and access group of the ACL rule do not match the access context and access group of the user, at 712, control manager 602 does not allow access.

Figure 8:
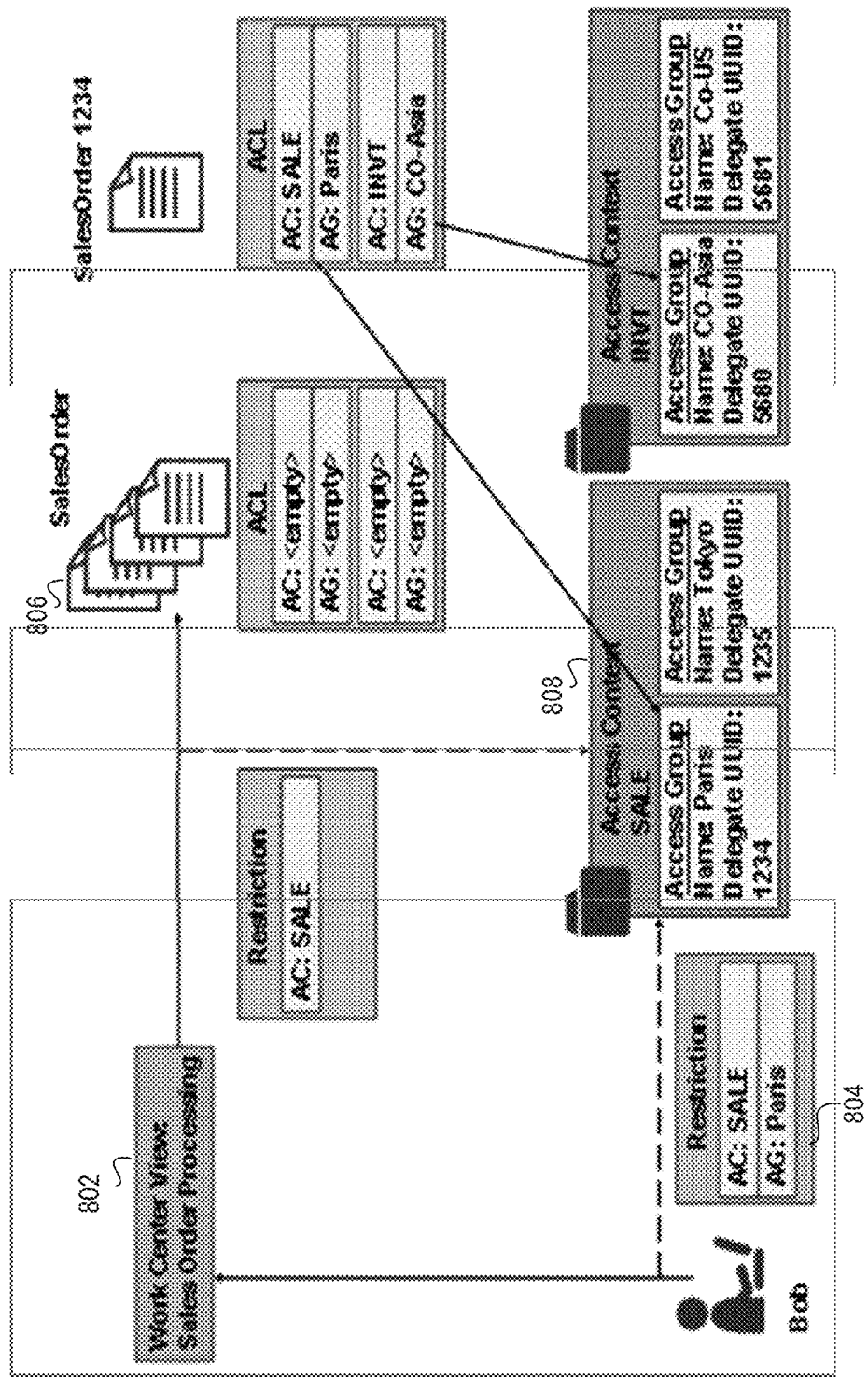
FIG. 8 depicts an example of determining whether to allow access according to one embodiment.

FIG. 8 depicts an example of determining whether to allow access according to one embodiment. As shown, a user would like to access sales orders at 802. At 804, the user includes the access context (AC) of "sale" and an access group (AG) of "Paris". At 806, sales orders are stored in replication table 114. A sales order 1234 has been requested by the user. Sales order 1234 includes an ACL rule that indicates the access context of "sale" and the access group of "Paris" in addition to another ACL rule that indicates an access context of "IMVT" and an access group of "CO-Asia". At 808, because the user includes a rule that includes an access context of "sale" and an access group of "Paris", the user is able to access sales order 1234.

FIG. 9 illustrates hardware of a special purpose computing machine configured with an access control system according to one embodiment. An example computer system 910 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable storage mediums.

Computer system 910 may be coupled via bus 905 to a display 912, such as a cathode ray tube (CRT) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information through the network interface 904 across a local network 920, an Intranet, or the Internet 930. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A computer implemented method comprising:
   replicating data from a first database system to a second database system, wherein the first database system includes authorizations without regard to entities to restrict access to data in the first database system and the second database system includes access control list (ACL) rules with regard to entities to restrict access to data in the second database system;
   determining a trigger table associated with the first database system, the trigger table including information for rows in tables of the first database system relevant to authorizations in the first database system, and wherein the trigger table comprises an identification to a first table associated with the first database system in which the data was replicated, an ACL field, and an ACL value;
   generating an access control list (ACL) report from the trigger table, the ACL report including information for setting ACL rules for the second database system;
   determining an access context for an entity from the ACL report, wherein the access context describes an organization in the entity; and
   generating an ACL rule based on the access context to restrict access to the replicated data in the second database system to users associated with the access context, wherein an authorization for the data in the first database system is transformed into the ACL rule based on the access context in the second database system, and wherein the ACL rule is added as a dependent object to a second table in the second database system.

2. The method of claim 1, wherein replicating the data from the first database system to the second database system comprises storing data from the first table in the first database system to the second table in the second database system, wherein the data in the second database system is associated with the ACL rule.

3. The method of claim 1, wherein the access context describes an organization in the entity.

4. The method of claim 3, wherein the access context includes an access group describing a group of users in the organization.

5. The method of claim 4, wherein the ACL rule specifies the access context and the access group for the replicated data.

6. The method of claim 1, wherein an authorization for the data in the first database system is transformed into the ACL rule based on the access context in the second database system.

7. A non-transitory computer-readable storage medium containing instructions, that when executed, control a computer system to be configured for:
   replicating data from a first database system to a second database system, wherein the first database system includes authorizations without regard to entities to restrict access to data in the first database system and the second database system includes access control list (ACL) rules with regard to entities to restrict access to data in the second database system;
   determining a trigger table associated with the first database system, the trigger table including information for rows in tables of the first database system relevant to authorizations in the first database system, and wherein the trigger table comprises an identification to a first table associated with the first database system in which the data was replicated, an ACL field, and an ACL value;
   generating an access control list (ACL) report from the trigger table, the ACL report including information for setting ACL rules for the second database system;
   determining an access context for an entity from the ACL report, wherein the access context describes an organization in the entity; and
   generating an ACL rule based on the access context to restrict access to the replicated data in the second database system to users associated with the access context, wherein an authorization for the data in the first database system is transformed into the ACL rule based on the access context in the second database system, and wherein the ACL rule is added as a dependent object to a second table in the second database system.

8. The non-transitory computer-readable storage medium of claim 7, wherein replicating the data from the first database system to the second database system comprises storing data from the first table in the first database system to the second table in the second database system, wherein the data in the second database system is associated with the ACL rule.

9. The non-transitory computer-readable storage medium of claim 7, wherein the access context describes an organization in the entity.

10. The non-transitory computer-readable storage medium of claim 9, wherein the access context includes an access group describing a group of users in the organization.

11. The non-transitory computer-readable storage medium of claim 10, wherein the ACL rule specifies the access context and the access group for the replicated data.

12. The non-transitory computer-readable storage medium of claim 7, wherein an authorization for the data in the first database system is transformed into the ACL rule based on the access context in the second database system.

13. A system comprising:
   a first database system including:
      back-end database tables; and
      authorizations for the back-end database tables, wherein the first database system includes authorizations without regard to entities to restrict access to data in the first database system; and
   a second database system comprising:
   one or more computer processors; and
   a non-transitory computer-readable storage medium containing instructions, that when executed, control the one or more processors to be configured for:
   replicating data from the first database system to the second database system, wherein the second database system includes access control list (ACL) rules with regard to entities to restrict access to data in the second database system;
   receiving a trigger table from the first database system, the trigger table including information for rows in tables of the first database system relevant to authorizations in the first database system, and wherein the trigger table comprises an identification to a first table associated with the first database system in which the data was replicated, an ACL field, and an ACL value;
   generating an access control list (ACL) report from the trigger table, the ACL report including information for setting ACL rules for the second database system;
   determining an access context for an entity from the ACL report, wherein the access context describes an organization in the entity; and
   generating an ACL rule based on the access context to restrict access to the replicated data in the second database system to users associated with the access context, wherein an authorization for the data in the first database system is transformed into the ACL rule based on the access context in the second database system, and wherein the ACL rule is added as a dependent object to a second table in the second database system.

14. The system of claim 13, wherein replicating the data from the first database system to the second database system comprises storing data from the first table in the first database system to the second table in the second database system, wherein the data in the second database system is associated with the ACL rule.

15. The system of claim 13, wherein the access context describes an organization in the entity.

16. The system of claim 13, wherein an authorization for the data in the first database system is transformed into the ACL rule based on the access context in the second database system.

* * * * *